Sept. 30, 1958
O. L. ISAAC
2,854,084
SAFETY WHEEL ASSEMBLY FOR CORN DETASSELER
Filed Feb. 20, 1956
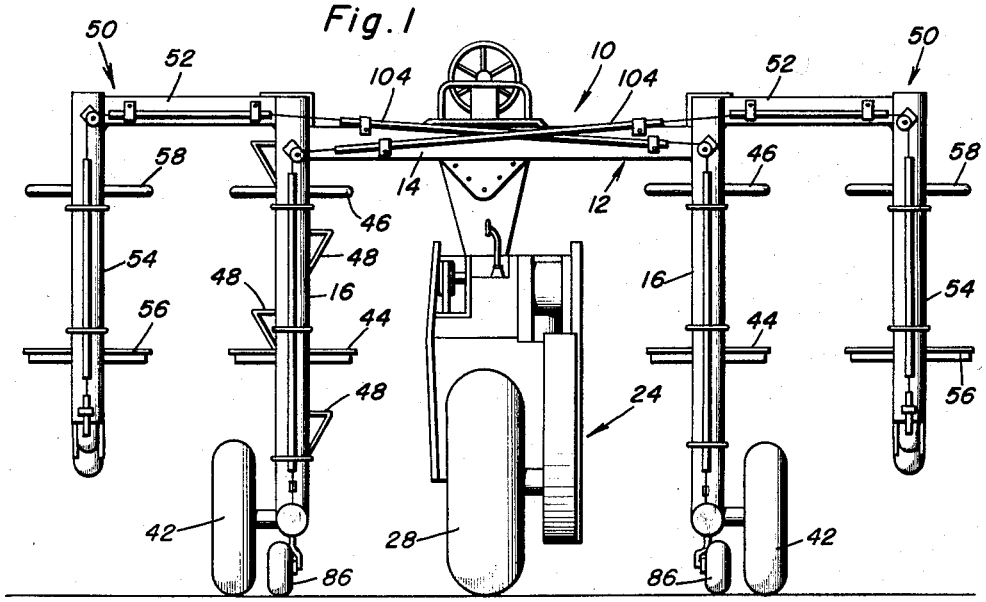
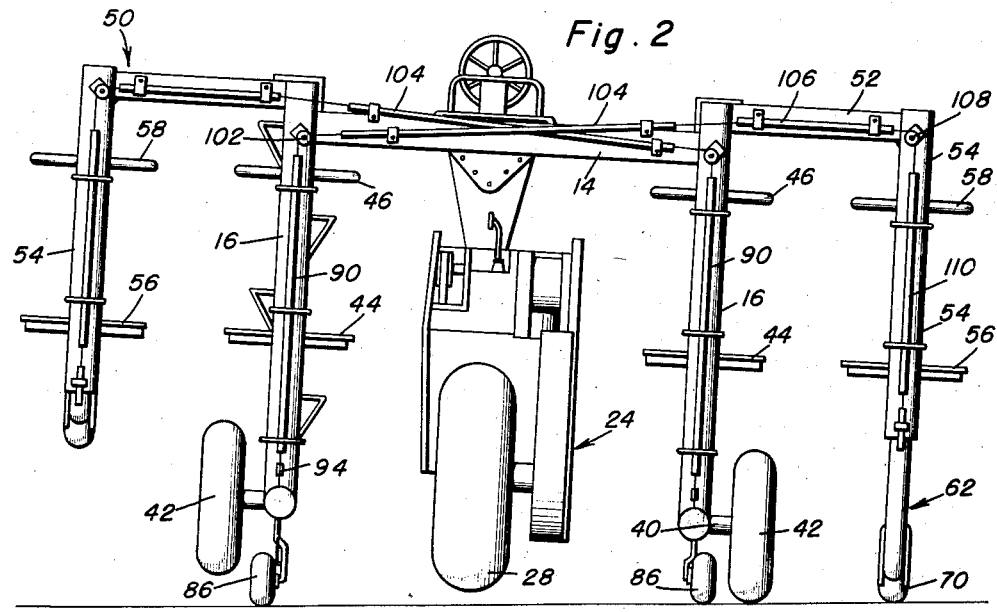
Otis L. Isaac
INVENTOR.

Sept. 30, 1958 O. L. ISAAC 2,854,084
SAFETY WHEEL ASSEMBLY FOR CORN DETASSELER
Filed Feb. 20, 1956 3 Sheets-Sheet 2

Otis L. Isaac
INVENTOR.

Sept. 30, 1958  O. L. ISAAC  2,854,084
SAFETY WHEEL ASSEMBLY FOR CORN DETASSELER
Filed Feb. 20, 1956  3 Sheets-Sheet 3
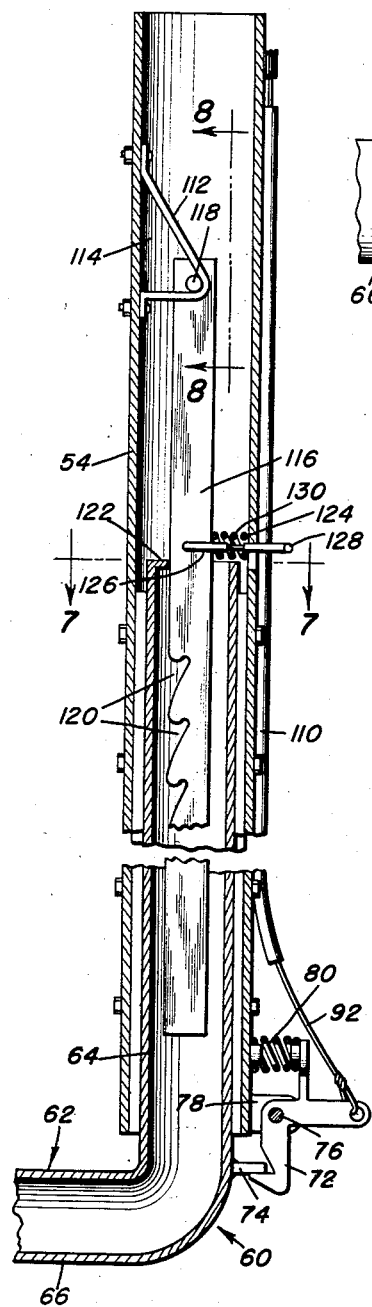
Fig. 5
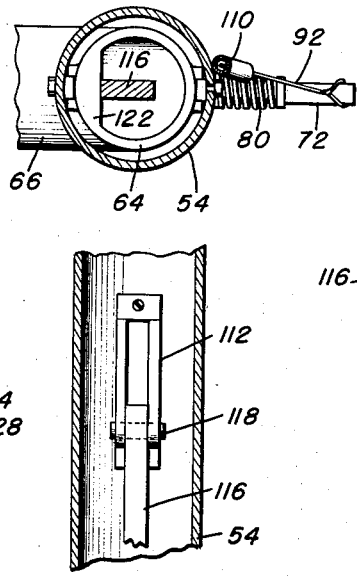
Fig. 7
Fig. 8
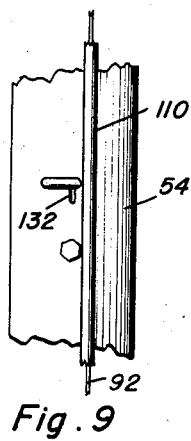
Fig. 9
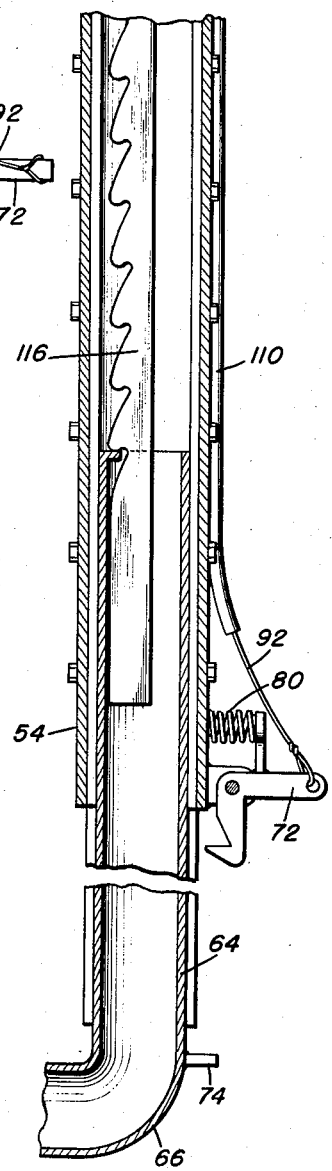
Fig. 6
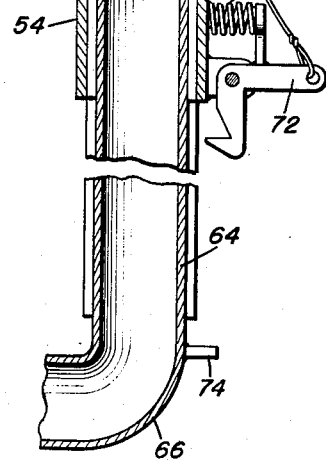
Otis L. Isaac
INVENTOR.
BY *Clarence A. O'Brien*
*and Harvey B. Jacobson*
Attorneys

United States Patent Office 2,854,084
Patented Sept. 30, 1958

2,854,084

SAFETY WHEEL ASSEMBLY FOR CORN DETASSELER

Otis L. Isaac, Mt. Carmel, Ill.

Application February 20, 1956, Serial No. 566,577

13 Claims. (Cl. 180—26)

This invention relates in general to new and useful improvements in farm implements, and more specifically to safety wheel assemblies for farm implements.

In order that certain types of farm implements may pass down between the rows of crops, they are constructed with a centrally disposed steerable and driven front wheel and a pair of spaced rear wheels. Normally these farm implements are of the harvester type and in addition to workman supports carried by rear frame members, they also include outrigger frame members which carry additional workman supports. Thus four rows may be worked at one time. However, because of the tricycle arrangement of the wheels and the relative unstableness caused by the outrigger frames, farm implements of this type have the tendency to turn over, particularly when turning around at the ends of the rows thus making them dangerous.

Is is therefore the primary object of this invention to provide a farm implement of the type which includes a steerable front wheel and rear wheels together with outrigger frames with auxiliary wheel assemblies carried by the outrigger frames for selective engagement with the ground to balance the farm implement and prevent accidental overturning of the same.

Another object of this invention is to provide a safety wheel assembly for farm implements, such as corn detasselers, the safety wheel assembly being so mounted on the farm implement whereby auxiliary wheels which form parts of the safety wheel assembly are automatically lowered in response to the tipping of the farm implement.

Still another object of this invention is to provide a safety wheel assembly for farm implements, such as corn detasselers, the safety wheel assembly including auxiliary wheels which are normally retracted and which are lowerable in response to the tipping of the farm implement, the operation of the safety wheel assembly being controlled by operator wheels normally disposed adjacent the outermost wheels of the farm implement, the operator wheels being spring urged downwardly and being moved when the adjacent wheel of the farm implement is raised due to the tilting of the farm implement.

A further object of this invention is to provide an improved mounting for an auxiliary wheel of a safety wheel assembly, the mounting being of such a nature whereby the auxiliary wheel is normally held in a retracted position and is gravity urged into engagement with the ground, there being provided suitable means for retaining the auxiliary wheel in a ground engaging position once it has been released.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevational view of a corn detasseler equipped with the safety wheel assembly which is the subject of this invention and shows the general details thereof in a normal operating position;

Figure 2 is a view similar to Figure 1 and shows the corn detasseler in a tilted position with one of the auxiliary wheels of the safety wheel assemblies being lowered in order to prevent overturning of the farm implement;

Figure 4:
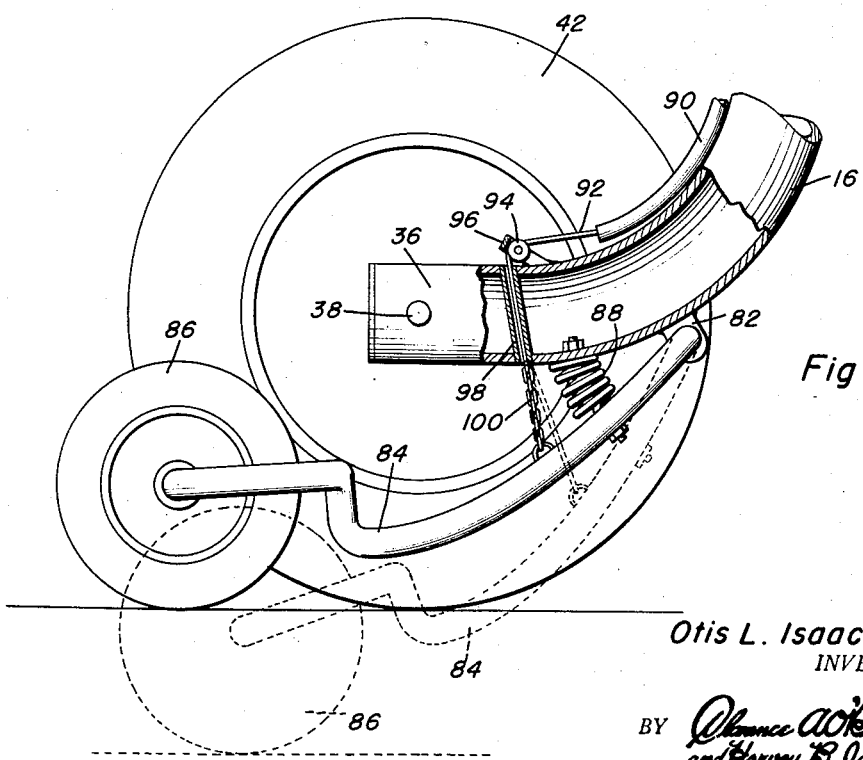

Figure 4 is an enlarged fragmentary side elevational view of one of the rear wheels of the corn detasseler and the mounting therefor, there being carried by the mounting for the rear wheel an operator wheel for operating the safety wheel assembly, a portion of the support for the rear wheel being broken away and shown in section in order to clearly illustrate certain details of the mounting of the operator wheel, the operator wheel being shown in an operative position by dotted lines;

Figure 5 is an enlarged vertical sectional view taken through one of the outrigger frames and shows the manner in which an auxiliary wheel support is carried thereby in a retracted position, an intermediate portion of the outrigger frame being broken away;

Figure 6 is an enlarged fragmentary vertical sectional view similar to Figure 5 and shows the auxiliary wheel support in a lowered position;

Figure 7 is an enlarged transverse horizontal sectional view taken substantially upon the plane indicated by the section line 7—7 of Figure 5 and shows further the details of the relationship between the auxiliary wheel support and the outrigger frame;

Figure 8 is an enlarged fragmentary vertical sectional view taken substantially upon the plane indicated by the section line 8—8 of Figure 5 and shows the mounting for a latch member carried by the outrigger frame; and Figure 9 is an enlarged fragmentary elevational view of one of the outrigger frames and shows the details of the retaining member for the latch member.

Figure 3:
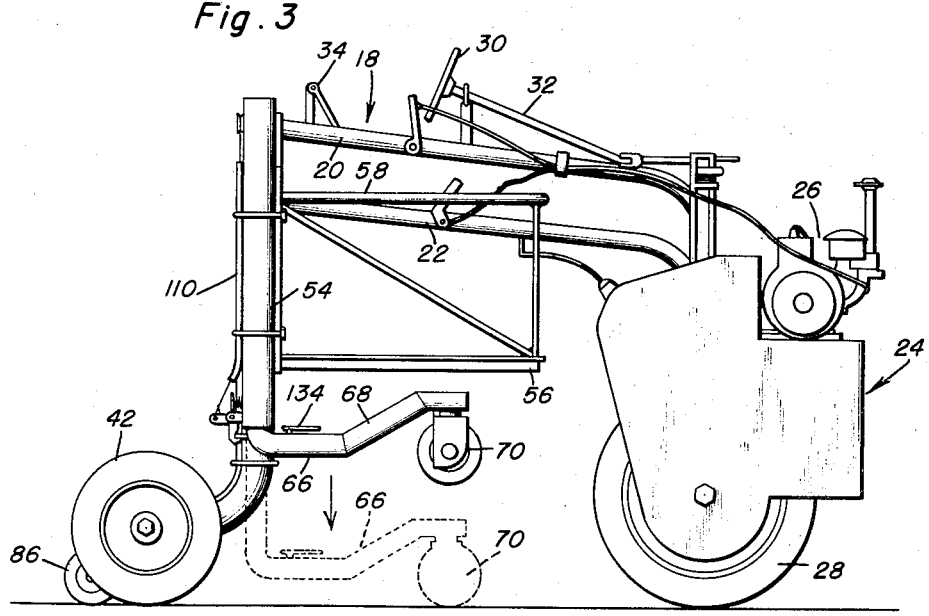
Figure 3 is a side elevational view of the farm implement and shows one of the auxiliary wheels in its normal raised position, the auxiliary wheel and its support being shown in a ground engaging position by dotted lines.

Referring now to the drawings in detail, it will be seen that there is illustrated in Figures 1, 2 and 3 a corn detasseler which is referred to in general by the reference numeral 10. The corn detasseler 10 is very similar to the corn detasseling machine disclosed in the patent to Raymond W. Hagie, et al. Patent No. 2,508,605, granted May 23, 1950.

The corn detasseler 10 includes a rear frame section which is referred to in general by the reference numeral 12. The rear frame section 12 includes an upper transverse frame member 14 which has secured to opposite ends thereof depending rear vertical frame members 16.

Secured to the rear frame section 14 is an intermediate, longitudinally extending frame section 18. The frame section 18 includes longitudinal frame members 20 and 22. Pivotally secured to the forward end of the intermediate section 18 is a front section 24. The front section 24 includes a power source 26 which is connected in driving relation to a steerable front wheel 28. The turning of the front section 24 is controlled by the steering wheel 30 and a steering column 32 which is positioned adjacent a suitable seat 34 carried by the intermediate section 18. It is to be understood that the front section 24 will be provided with suitable controls for the operation of the power unit 26.

The lower ends of the vertical frame members 16 are rearwardly turned as at 36, as is best illustrated in Figure 4. Extending outwardly from the rearwardly turned portions 36 are axles 38 carrying spacers 40. Mounted on the outer ends of the axles 38 are rear wheels 42. The rear wheels 42 are transversely spaced and are disposed in triangular relationship with the front wheel 28.

Carried by the vertical frame members 16 are forwardly extending platforms 44 having vertically spaced safety railings 46. If desired, the vertical frame members 16 may be provided with suitable steps 48 providing access to the platform 44.

In order that additional workmen may be supported on the corn detasseler 10 so that the corn detasseler 10 may handle four rows, there is carried by each of the vertical frame members 16 an outrigger frame which is referred to in general by the reference numeral 50. Each outrigger frame 50 includes a horizontal frame member 52 which extends outwardly from the upper end of the associated vertical frame member 16. Depending from the outer end of the horizontal frame member 52 is a vertical frame member 54. Extending forwardly from each of the vertical frame members 54 is a platform 56 which is provided with a safety railing 58.

From the foregoing description of the corn detasseler 10, it will be readily apparent that it has a relatively high center of gravity and because of the tricycle arrangement of the wheels 28 and 42, it is relatively unstable. As the corn detasseler 10 progresses through a field, in the event one of the rear wheels 42 drops down into a hole, there is a tendency for the corn detasseler 10 to shift. Inasmuch as the workman will be thrown by the shifting, this causes an overshifting and in certain instances overturning of the corn detasseler 10. This is particularly true when making a turn at the end of the row.

In order to prevent accidental overturning of the corn detasseler 10, each of the vertical frame members 54 is provided with a safety wheel assembly which is referred to in general by the reference numeral 60. Each safety wheel assembly 60 includes an auxiliary wheel support 62 which is formed of a vertical portion 64 and a horizontal portion 66. The horizontal portion 66 has an upwardly offset forward part 68 which carries a caster wheel assembly 70, the caster wheel assembly 70 being in the form of an auxiliary wheel.

It is to be noted that the vertical frame members 54 are tubular and that the vertical portion 64 of each auxiliary wheel support 62 is telescoped in one of the vertical frame members 54. The vertical portion 64 is also tubular for a purpose to be described in more detail hereinafter. Normally the auxiliary wheel support 62 is retained in a retracted, inoperative position by means of a latch member 72. The latch member 72 is engaged with a keeper 74 carried by the lower part of the vertical portion 64. The latch member 72 is mounted on a pin 76 carried by a suitable mounting bracket 78. The latch member 72 is urged into engagement with the keeper 74 by means of a spring 80.

In order to operate the latch member 74 to permit the lowering of the auxiliary wheel support 62 by gravity, there is carried by each rearwardly curved portion 36 a bracket 82 which has pivotally supported thereby a trailing arm 84. Carried by each trailing arm 84 at the rear end thereof is a control wheel 86. The control wheel 86 is disposed closely adjacent a respective one of the rear wheels 42 and is spring urged into engagement by a spring 88 disposed between the curved portion 36 and the trailing arm 84.

Carried by each vertical frame member 16 on the rear surface thereof is a sleeve 90 through which there is passed a cable 92. The cable 92 passes over a pulley 94 supported on the curved portion 36 by a bracket 96. Passing through the curved portion 36 is a sleeve 98. The cable 92 passes downwardly through the sleeve 98 and has connected to the lower end thereof a short section of chain 100. The lower end of the chain 100 is connected to the trailing arm 84.

As is best illustrated in Figure 2, each of the sleeves 90 terminates short of the upper end of its respective vertical frame member 16 and passes over a pulley 102. Aligned with the pulley 102 is a transverse sleeve 104 carried by the horizontal frame member 14. The transverse sleeves 104 are disposed in crossed relation and have their opposite ends aligned with sleeves 106 carried by the horizontal frame members 52.

Disposed at the outer end of each of the horizontal sleeves 106 is a pulley 108 supported by one of the vertical frame members 54. Aligned with the pulley 108 is a vertical sleeve 110 carried by the rear surface of the associated vertical frame member 54. Each cable 92 passes upwardly through its respective sleeve 90, over its respective pulley 102, through its respective sleeve 104, through its respective sleeve 106, over its respective pulley 108 and down through its respective sleeve 110. The end of the cable 92 remote from the chain 100 is connected to the latch member 72 for moving it to an inoperative position.

Because of the cross relation of the cables 92, it will be readily apparent that the right hand control wheel 86 will control the lowering of the left hand auxiliary wheel support 62 to permit the auxiliary wheel 70 carried thereby to be lowered into engagement with the ground.

Referring to Figure 4 in particular, it will be seen that when the corn detasseler 10 tips to the right, as is shown in Figure 2, the left hand rear wheel 42 raises off the ground with the result that the control wheel 86 associated therewith will move downwardly relative to the left hand rear wheel 42 due to the urging of the spring 88 to retain the control wheel 86 in engagement with the ground at all times. This will result in the pulling on the left hand cable 92 which in turn will release the right hand latch member 72. The right hand auxiliary wheel 70 will then move downwardly into engagement with the ground, as is illustrated in Figure 2, to prevent further tipping of the corn detasseler 10 to the right.

The auxiliary wheel support 62 and the auxiliary wheel 70 carried thereby will fall into the lowered position by gravity. However, the mere lowering of the auxiliary wheel 70 will not permit it to assume any load as is necessary in the proper support of the corn detasseler 10. In order that the auxiliary wheel 70 may assume a load, there is mounted in each of the vertical frame members 54 adjacent the upper end thereof a bracket 112 defining a triangular space 114. The bracket 112, as is best illustrated in Figure 8, is of the bifurcated type and has disposed between the halves thereof an upper end of a vertical depending latch member 116. The latch member 116 is provided at its upper end with a pin 118 which is disposed in the triangular space 114 and retained by the bracket 112 for pivoting and sliding movement.

The latch member 116 passes downwardly into the respective vertical portions 64 and is provided with a plurality of vertically spaced, downwardly opening notches 120. The notches 120 are formed in the forward edge of the latch member 116 and are engaged with a lip 122 formed on the upper end of the vertical portion 64 to prevent the upward movement of the auxiliary wheel support 62 thus permitting the auxiliary wheel 70 carried thereby to assume a load.

In order that the latch member 116 may be urged into engagement with the lip 122, there is provided a coil spring 124 bearing against the rear edge of the latch member 116, as is best illustrated in Figure 5. The coil spring 124 is carried by a retaining member 126, which passes out through the rear part of the vertical frame member 54. The retaining member 126 terminates in its rear end in a handle portion 128. The retaining member 126 also includes a reduced intermediate portion 130 which is receivable in a vertical slot 132 formed in the vertical frame member 54.

Normally the vertical portion 64 is so positioned within its respective vertical frame member 54 that the latch member 116 does not operate. However, when the auxiliary wheel support 62 is released, it will drop downwardly so that the lip 122 will become engaged in one of the notches 120. At the same time the latch member 116 will be urged forwardly by the coil spring 124 to retain the latch member 116 engaged with the lip 122.

The auxiliary wheel support 62 must be manually moved back to its inoperative position. In order to facilitate the lifting of the auxiliary wheel support 62 and the auxiliary wheel 70 carried thereby, the horizontal portion 66 is provided with a suitable handle 134, as is best illustrated in Figure 3. Also, in order to retain the latch member 116 in inoperative position, the handle 134 is used to move the retaining member 126 rearwardly. The intermediate portion 130 is moved downwardly into the notch 132. After the latch member 72 has been engaged with the keeper 74 to retain the auxiliary wheel support 62 in the inoperative position of Figure 5, the handle 128 may again be moved upwardly and the retaining member 126 released.

By providing the corn detasseler 10 with the auxiliary wheel assembly 60, it will be readily apparent that accidental overturning of the corn detasseler 10 is prevented. Inasmuch as the auxiliary wheels 70 are disposed at the outermost point of the corn detasseler 10, overturning thereof is rendered virtually impossible.

While the invention has been described and illustrated with respect to a corn detasseler, it is to be understood that it is not to be so limited. It may be used in conjunction with other farm implements, such as tobacco harvesters and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position out of engagement with the ground, and control means carried by said rear frame section connected to said auxiliary wheel supports for lowering said auxiliary wheels into engagement with the ground in response to tipping of said farm implement.

2. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said control means including a ground engaging control wheel for each of said auxiliary wheel supports.

3. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said control means including a ground engaging control wheel for each of said auxiliary wheel supports, each of said control wheels being mounted on an opposite side of said farm implement from its respective auxiliary wheel support.

4. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said control means including a ground engaging control wheel for each of said auxiliary wheel supports, cable means connecting each of said control wheels to a respective one of said auxiliary wheel supports.

5. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said control means including a ground engaging control wheel for each of said auxiliary wheel supports, cable means connecting each of said control wheels to a respective one of said auxiliary wheel supports, each of said control wheels being mounted on an opposite side of said farm implement from its respective auxiliary wheel support.

6. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said auxiliary wheel supports each having a vertical portion telescoped within a respective one of said outrigger frames, catch means normally retaining said auxiliary wheel supports in retracted positions, said control means being connected to said catch means.

7. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said auxiliary wheel supports each having a vertical portion telescoped within a respective one of said outrigger frames, catch means normally retaining said auxiliary wheel supports in retracted positions, said control means being connected to said catch means, latch means carried by said outrigger frames engaged with said vertical portion preventing retraction of said auxiliary supports.

8. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position out of engagement with the ground, and control means carried by said rear frame section connected to said auxiliary wheel supports for lowering said auxiliary wheels into engagement with the ground in response to tipping of said farm implement, said control means including a separate control assembly for each of said auxiliary wheels, each of said control assemblies being disposed on an opposite side of said farm implement from a respective one of said auxiliary wheels.

9. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said auxiliary wheel supports each having a vertical portion telescoped within a respective one of said outrigger frames, catch means normally retaining said auxiliary wheel supports in retracted positions, said control means being connected to said catch means, said control means including a separate control assembly for each of said auxiliary wheels, each of said control assemblies being disposed on an opposite side of said farm implement from a respective one of said auxiliary wheels.

10. In combination with a farm implement of the type including a rear frame section having spaced rear wheels, a front frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said auxiliary wheel supports each having a vertical portion telescoped within a respective one of said outrigger frames, catch means normally retaining said auxiliary wheel supports in retracted positions, said control means being connected to said catch means, latch means carried by said outrigger frames engaged with said vertical portion preventing retraction of said auxiliary supports, said control means including a separate control assembly for each of said auxiliary wheels, each of said control assemblies being disposed on an opposite side of said farm implement from a respective one of said auxiliary wheels.

11. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said auxiliary wheel supports each having a vertical portion telescoped within a respective one of said outrigger frames, catch means normally retaining said auxiliary wheel supports in retracted positions, said control means being connected to said catch means, said control means including a ground engaging control wheel for each of said auxiliary wheel supports.

12. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position, and control means carried by said rear frame section connected to said auxiliary wheel supports for lowering said auxiliary wheels in response to tipping of said farm implement, said auxiliary wheel supports each having a vertical portion telescoped within a respective one of said outrigger frames, catch means normally retaining said auxiliary wheel supports in retracted positions, said control means being connected to said catch means, said control means including a ground engaging control wheel for each of said auxiliary wheel supports, each of said control wheels being mounted on an opposite side of said farm implement from its respective auxiliary wheel support.

13. In combination with a farm implement of the type including a rear frame section having spaced rear wheels, a front combined driving and steering section connected to said rear frame section, said front section having a single front wheel arranged in tricycle arrangement with said rear wheels, and outrigger frames extending outwardly from said rear frame section; an auxiliary wheel assembly for preventing overturning of said farm implement, said auxiliary wheel assembly comprising an auxiliary wheel for each of said outrigger frames, an auxiliary wheel support mounting each auxiliary wheel in a normally retracted position out of engagement with the ground, and ground engaging control means carried by said rear frame section connected to said auxiliary wheel supports for lowering said auxiliary wheels into engagement with the ground in response to tipping of said farm implement.

References Cited in the file of this patent

UNITED STATES PATENTS

| | | |
|---|---|---|
| 1,183,689 | Souders | May 16, 1916 |
| 2,208,600 | Ronning | July 23, 1940 |
| 2,368,219 | Heath | Jan. 30, 1945 |
| 2,508,605 | Hagie et al. | May 23, 1950 |
| 2,693,162 | Poche | Nov. 2, 1954 |
| 2,750,204 | Ohrmann | June 12, 1956 |

FOREIGN PATENTS

| | | |
|---|---|---|
| 975,601 | France | Oct. 17, 1950 |